June 6, 1961   B. G. WILKERSON   2,986,908
SHAFT COUPLING
Filed Dec. 15, 1958   4 Sheets-Sheet 1
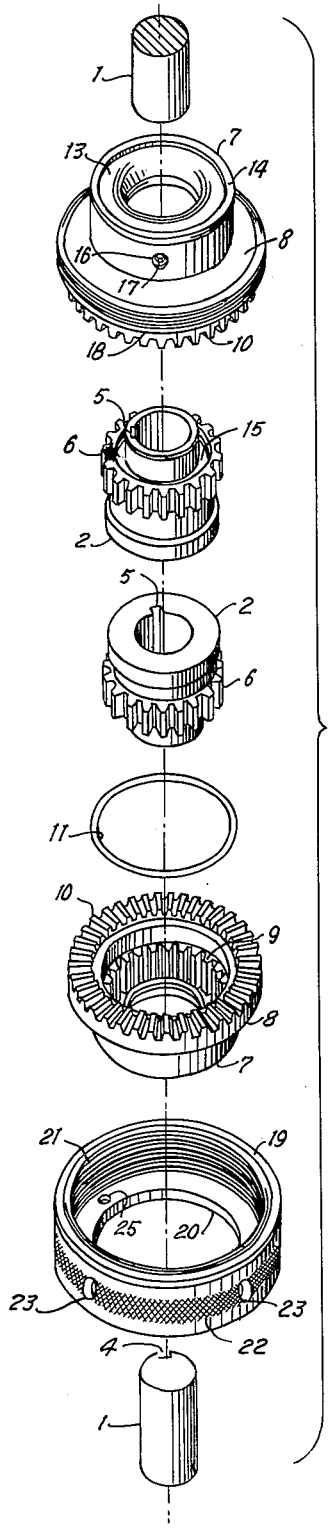
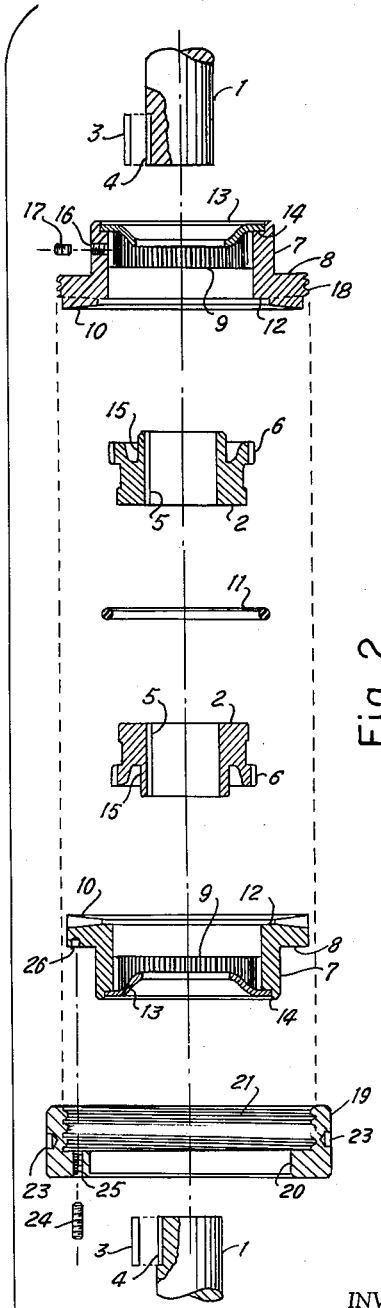
INVENTOR
Basil G. Wilkerson
BY
ATTORNEY June 6, 1961 B. G. WILKERSON 2,986,908
SHAFT COUPLING Filed Dec. 15, 1958 4 Sheets-Sheet 2

INVENTOR
Basil G. Wilkerson

BY Cecil L. Wood

ATTORNEY

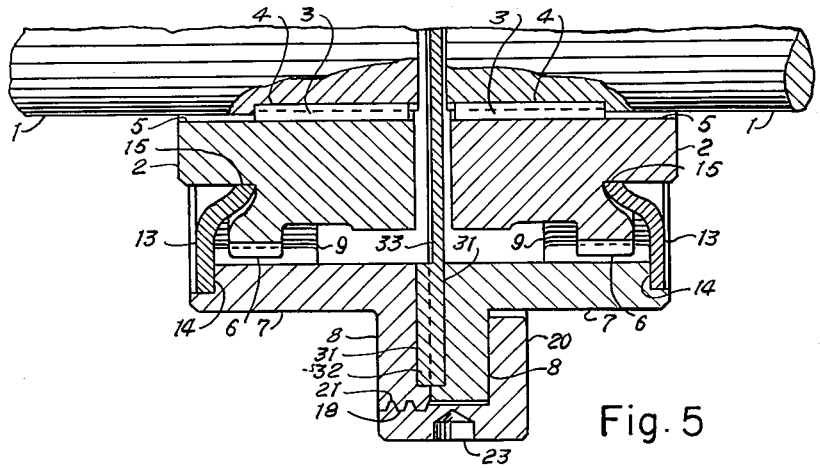
Fig. 5
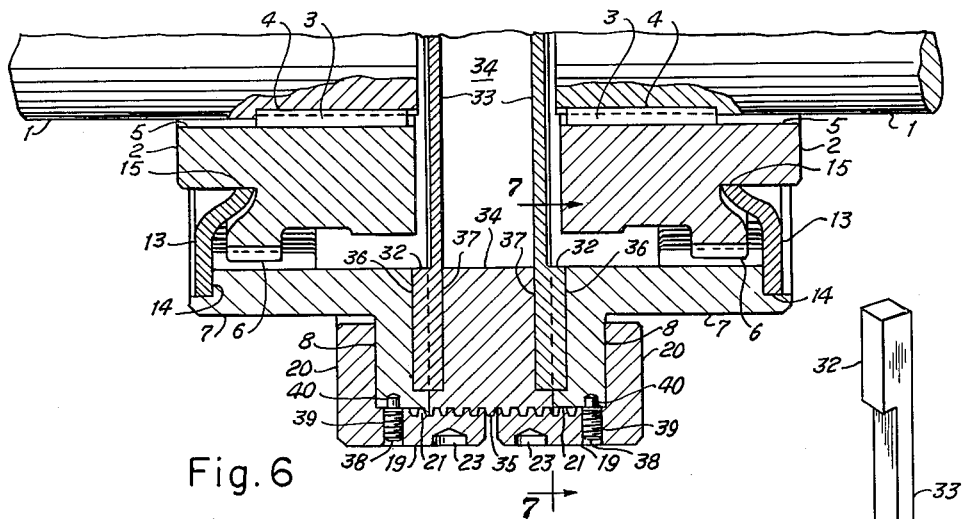
Fig. 6
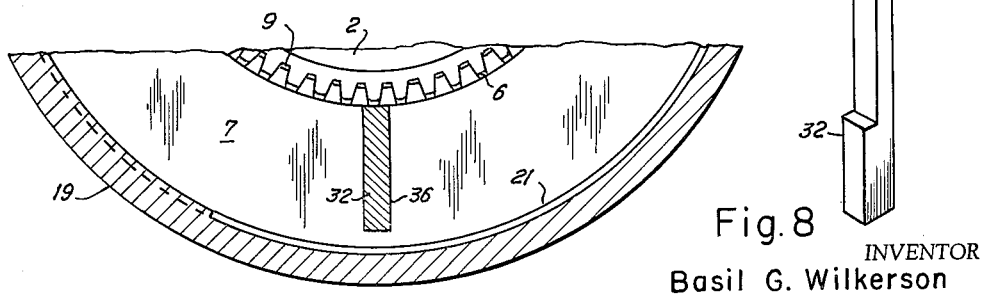
Fig. 7
Fig. 8
INVENTOR
Basil G. Wilkerson
BY
ATTORNEY June 6, 1961 B. G. WILKERSON 2,986,908
SHAFT COUPLING
Filed Dec. 15, 1958 4 Sheets-Sheet 4

INVENTOR
Basil G. Wilkerson

BY *Cecil L. Wood*

ATTORNEY

United States Patent Office 2,986,908
Patented June 6, 1961

2,986,908
SHAFT COUPLING
Basil G. Wilkerson, 1619 Ridgecrest, Odessa, Tex.
Filed Dec. 15, 1958, Ser. No. 780,365
2 Claims. (Cl. 64—9)

This invention relates to a shaft coupling, and it concerns more particularly a coupling for drivingly connecting a pair of rotatable shafts whereby one of the shafts is capable of being driven by the other.

An object of the invention is to provide a shaft coupling for rotatable shafts which is particularly adapted for use in heavy machinery.

Another object of the invention is to provide a coupling for rotatable shafts whereby a driving shaft and a driven shaft may be quickly and easily connected to and disconnected from each other.

Another object of the invention is to provide a shaft coupling for rotatable shafts which is of simple, rugged construction, may be manufactured inexpensively, and is efficient in operation and durable in use.

The invention will be readily understood by referring to the following description and the accompanying drawing, in which:

FIGURE 1 is an exploded perspective view of a shaft coupling embodying the invention;

FIGURE 2 is an exploded longitudinal sectional view taken on a median line;

FIGURE 5 is a fragmentary longitudinal sectional view, taken on a median line, showing another form of the invention;

FIGURE 6 is a fragmentary longitudinal sectional view, taken on a median line, showing another form of the invention;

FIGURE 7 is a fragmentary transverse sectional view taken on the line 7—7 of FIGURE 6;

FIGURE 8 is a perspective view of one of the keys shown in FIGURES 5 to 7;

Figure 3:
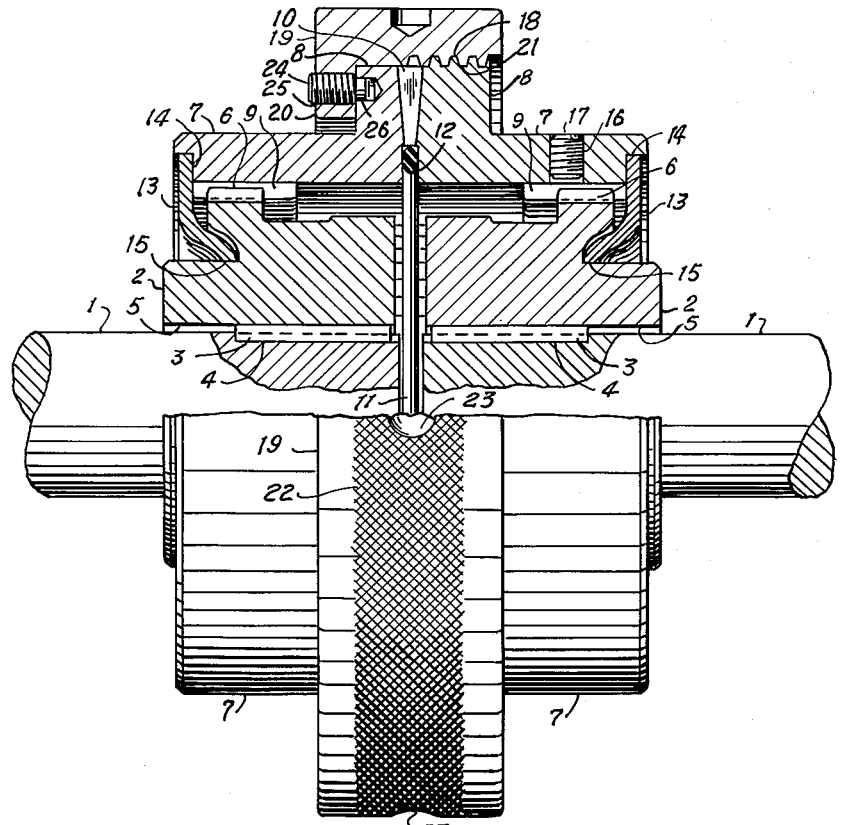
FIGURE 3 is a longitudinal view, partly in section taken on a median line.

Referring to FIGURES 1 to 3 of the drawing, the numerals 1 designate a pair of rotatable shafts which are connected by the coupling of this invention, the shafts 1 being shown fragmentarily.

A pair of annular fittings 2 surround the respective shafts 1, adjacent their adjoining ends, and are secured thereto by press fit. The annular fittings 2 are secured against rotation relative to the shafts 1 by keys 3, which are received in aligned longitudinal slots 4 and 5 provided therefor in the peripheral surfaces of the shafts 1 and the inner walls of the annular fittings 2, respectively.

The annular fittings 2 are splined externally adjacent their opposite ends, as at 6, for use as hereinafter described.

A pair of cylindrical coupling members 7, which are flanged outwardly at one end, as at 8, surround the respective annular fittings 2 and are positioned with their flanges 8 in opposed relation to each other. The coupling members 7 are splined internally adjacent their opposite ends, as at 9, for engagement with the externally splined portions 6 of the annular fittings 2 whereby the annular fittings 2, which are keyed on the shafts 1 as above described, are rotatable with the coupling members 7.

A plurality of circumferentially spaced, mutually engaging teeth 10 are formed on the opposed surfaces of the coupling members 7, whereby the coupling members 7 are capable of being rotated together.

A resilient O ring 11 is received in annular recesses 12 provided therefor in the opposed surfaces of the coupling members 7, radially inwardly of the teeth 10, and provides a seal between the coupling members 7.

A pair of flexible, annular diaphragms 13 have their peripheral edges received in annular recesses 14 provided therefor in opposite ends of the respective coupling members 7, and secured therein by press fit. The diaphragms 13 are flexed radially and longitudinally inwardly from their peripheral edges. The inner edges of the diaphragms 13 are received in annular recesses 15 provided therefor in the adjacent ends of the annular fittings 2, and frictionally engage the inner walls of the recesses 15, which are cylindrical. The diaphragms 13 resist longitudinal movement of the coupling members 7 relative to the annular fittings 2, and provide seals therebetween.

The annular space between the coupling members 7 and the annular fittings 2 advantageously may be filled with oil. A threaded opening 16, which is normally closed by a threaded plug 17 received therein, is provided in one of the coupling members 7 for that purpose.

A peripheral thread 18 is formed on the flange 8 of one of the coupling members 7. A collar 19, which is flanged inward at one end, as at 20, surrounds the flanges 8 of the coupling members 7. The flange 20 forms an abutment for engagement with the flange 8 opposite the flange having the peripheral thread 18, and the collar 19 is threaded internally, as at 21, for engagement with the peripheral thread 18.

The exterior surface of the collar 19 is knurled, as at 22, and a plurality of circumferentially spaced openings 23 are formed therein for engagement by a wrench. The arrangement is such that the coupling members 7 may be secured in juxtaposed relation to each other upon tightening the collar 19.

A threaded pin 24 is inserted through a threaded opening 25 provided therefor in the flange 20, and has one of its ends received in a corresponding opening 26 provided therefor in the flange 8 of the adjacent coupling member 7, whereby the collar 19 is prevented from being rotated relative to the coupling members 7, to thereby loosen the collar 19.

Figure 4:
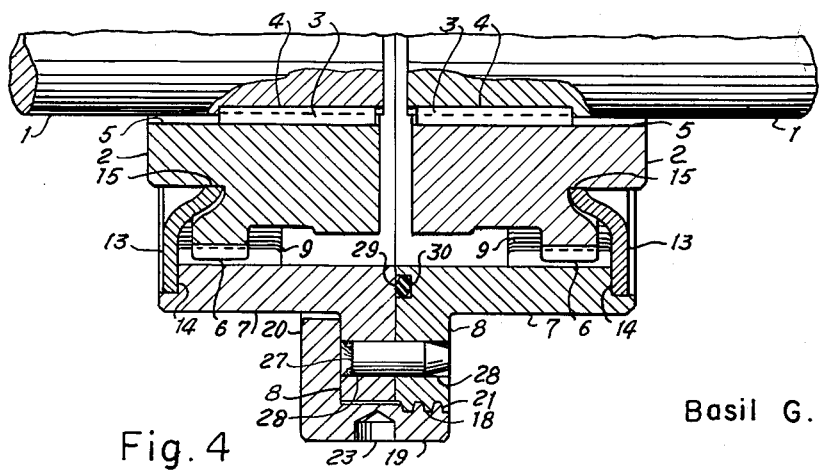
FIGURE 4 is a fragmentary longitudinal sectional view, taken on a median line, showing a modified form of the invention.

As shown in FIGURE 4, the coupling members 7 do not have mutually engaging teeth on the opposed surfaces thereof corresponding to the teeth 10 shown in FIGURES 1 to 3. A dowel pin 27 is inserted in aligned openings 28 provided therefor in the juxtaposed flanges 8, and is secured therein by welding it to one of the coupling members 7, whereby the coupling members 7 are prevented from being rotated relative to each other.

A resilient O-ring 29, which corresponds to the O-ring 11 shown in FIGURES 1 to 3, is received in an annular groove 30 provided therefor in an end face of one of the coupling members 7, and provides a seal between the coupling members 7.

As shown in FIGURE 5, two pairs of diametrically opposed, radially extending slots 31 are formed in the opposed end faces of the coupling members 7. A pair of keys 32, which are formed integrally with a connecting bar 33, as shown in FIGURE 8, are each received in one of the slots 31 of each pair, whereby the coupling members 7 are capable of being rotated together.

As shown in FIGURES 6 and 7, an annular spacer element 34 is disposed between the coupling members 7. The spacer element 34 is threaded externally, as at 35, and the coupling members 7 are connected to opposite sides thereof by a pair of collars 19. The flanges 20 of the collars 19 abut the adjacent flanges 8 of the coupling members 7, and the threads 21 of the collars 19 engage the threads 35 of the spacer element 34.

Two pairs of diametrically opposed, radially extending slots 36, which correspond to the slots 31 shown in FIGURE 5, are formed in the opposed end faces of the coupling members 7, and corresponding slots 37 are formed in the adjacent end faces of the spacer element 34. A pair of keys 32, which are formed integrally with a connecting bar 33, as above described, are each received in one of the slots 36 of the coupling members 7, and a corresponding slot 37 of the spacer element 34, whereby the coupling members 7 and the spacer element 34 are capable of being rotated together.

A pair of threaded pins 38, which correspond to the threaded pin 24 shown in FIGURES 1 to 3, are inserted through threaded openings 39 provided therefor in the collars 19, and are received in corresponding openings 40 provided therefor in the peripheral surfaces of the adjacent flanges 8, whereby the collars 19 are prevented from being rotated relative to the spacer element 34, to thereby loosen the collars 19.

Figure 9:
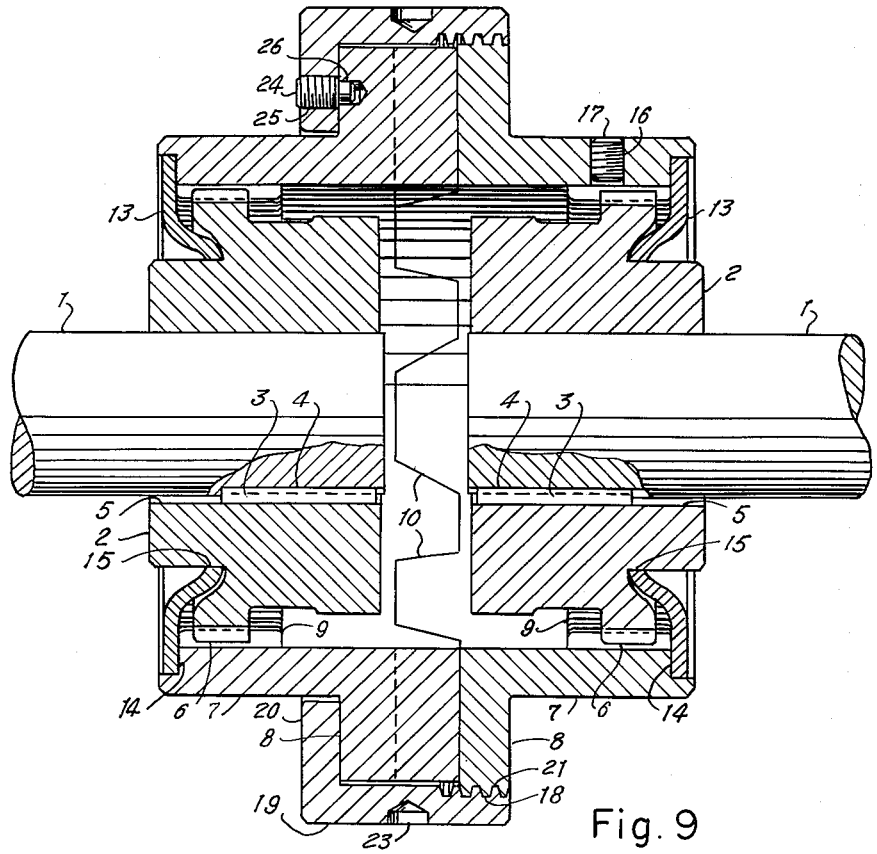
FIGURE 9 is a longitudinal sectional view, taken on a median line, showing another form of the invention.
Figure 10:
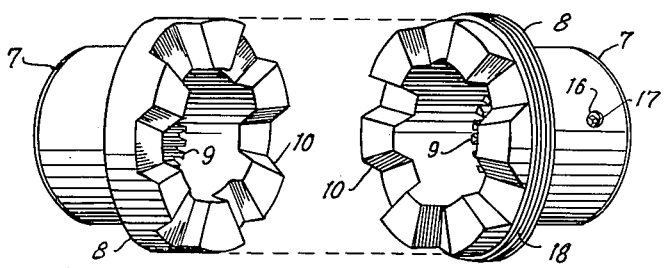
FIGURE 10 is an exploded perspective view of a pair of mutually opposed coupling members shown in FIGURE 9.

The arrangement shown in FIGURES 9 and 10 is essentially the same as that shown in FIGURES 1 to 3, the principal difference being that the teeth 10 shown in FIGURES 9 and 10 are of different design.

The invention may be modified in various ways without departing from the spirit and scope thereof.

What is claimed is:

1. A coupling for drivingly connecting a pair of rotatable shafts, whereby one of the shafts is adapted to be driven by the other, comprising, in combination with a pair of shafts arranged substantially end to end, a pair of annular fittings keyed on the respective shafts, adjacent their adjoining ends, and rotatable therewith, a pair of cylindrical coupling members, each flanged outwardly at one end, surrounding the respective annular fittings and positioned with their flanges in opposed relation to each other, the coupling members and the annular fittings having mutually engaging splines whereby the coupling members are rotatable with the annular fittings, mutually engaging means connected to the coupling members whereby the coupling members are adapted to be rotated together, means removably connecting the flanges of the coupling members in mutually opposed relation to each other consisting of a collar surrounding the flanges of the coupling members, the collar having a radially inwardly extending flange abutting the flange of one of the coupling members, the collar and the flange of the opposite coupling member having mutually engaging threads whereby the flanges of the coupling members are adapted to be connected in mutually opposed relation to each other upon tightening the collar, and a pair of flexible annular diaphragms having their peripheral edges secured to opposite ends of the respective coupling members, the inner edges of the diaphragms yieldably and frictionally engaging annular recesses in the outer ends of the adjacent annular fittings to resist longitudinal movement of the coupling members relative to the annular fittings and to provide seals therebetween.

2. The structure of claim 1, the mutually engaging means connected to the coupling members whereby the coupling members are adapted to be rotated together consisting of a plurality of circumferentially spaced, mutually engaging teeth formed on the opposed surfaces of the coupling members.

References Cited in the file of this patent

UNITED STATES PATENTS

| 2,421,546 | Dalton | June 3, 1947 |
| 2,510,414 | Philbrick | June 6, 1950 |
| 2,608,071 | Baudry | Aug. 26, 1952 |
| 2,637,986 | Iredell | May 12, 1953 |
| 2,659,217 | Tabot | Nov. 17, 1953 |

FOREIGN PATENTS

| 511,529 | Canada | Apr. 5, 1955 |